Aug. 28, 1962
R. C. GIESSE
3,050,858
FILTER CAKE DETECTOR
Filed Sept. 8, 1959
2 Sheets-Sheet 1
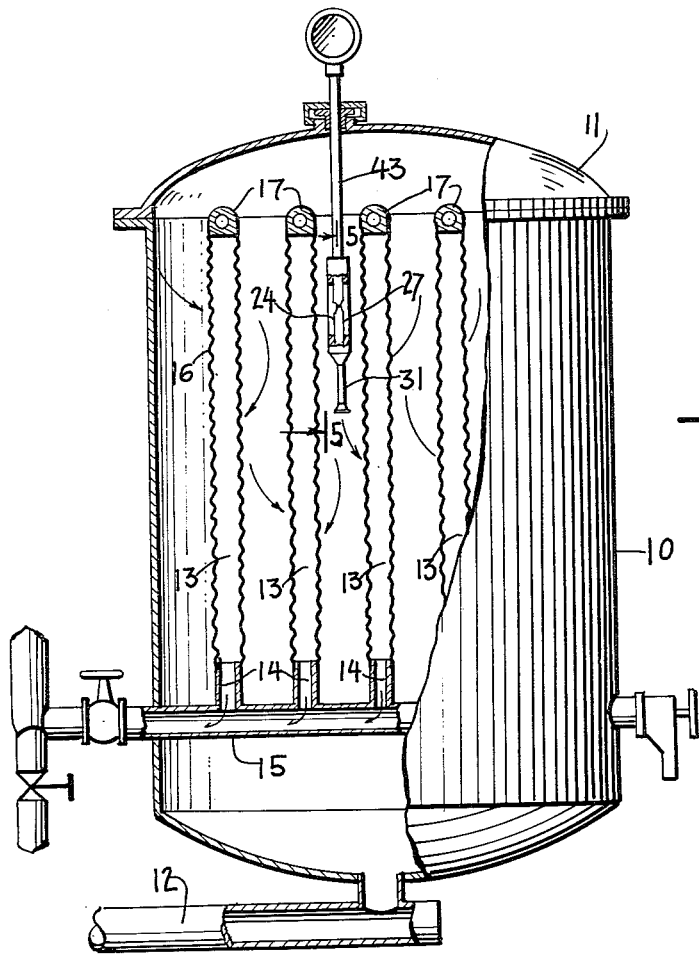
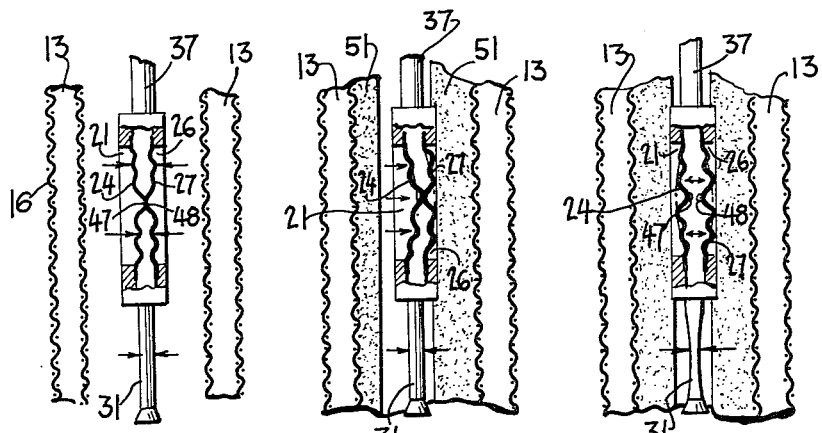
INVENTOR
ROBERT C. GIESSE
BY
Pollard Johnston Smythe Robertson
ATTORNEYS

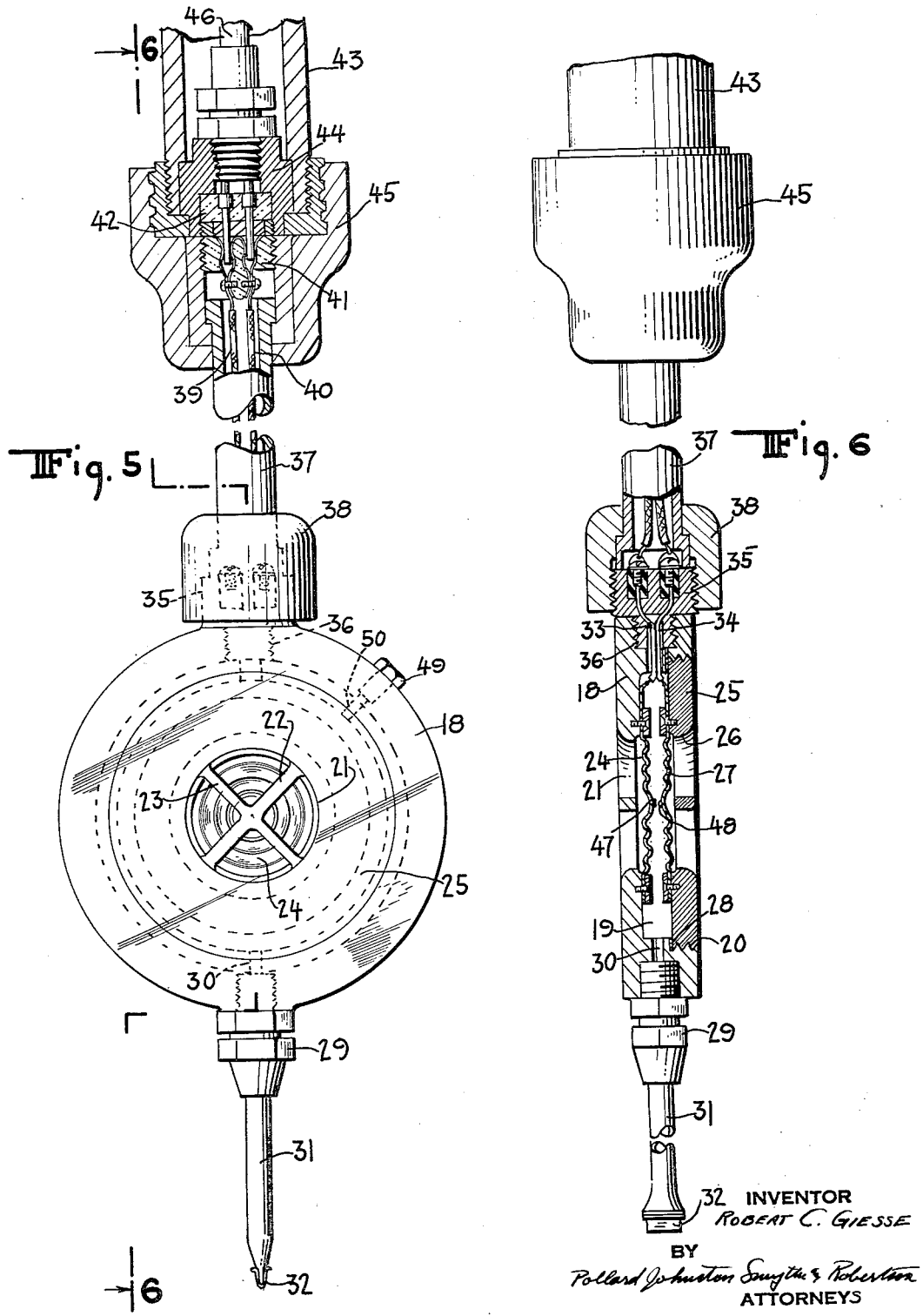

United States Patent Office 3,050,858
Patented Aug. 28, 1962

3,050,858
FILTER CAKE DETECTOR
Robert C. Giesse, Bettendorf, Iowa, assignor to Ametek, Inc., a corporation of Delaware
Filed Sept. 8, 1959, Ser. No. 838,496
14 Claims. (Cl. 33—168)

The present invention relates to detectors and particularly to a new and improved filter cake spacing detector.

Industrial filtering apparatus generally employs a plurality of parallel, spaced filtering elements which require periodic cleaning of the filter cake accumulated on the filtering media between adjacent elements, and the efficiency of such apparatus may be greatly impaired if such cake is not removed when the spacing between adjacent cakes has attained a predetermined dimension. If cake build-up becomes excessive and the cake from adjacent leaves should bridge over, the unbalanced pressures frequently cause distortion or destruction of the leaves.

Devices have been developed for detecting the thickness of cake by the differential in pressure between the prefilt and that slightly within the cake of solids that collects on the filtering media. While such devices have met with a degree of success, they are indicative of only the thickness of the cake and do not detect the spacing of the cakes adjacent filtering elements which is a more direct measure of the filtering cycle limitation. For example, the thickness of cake on adjacent elements may build up at different rates so that the thickness being measured on one element may not be indicative that the cakes on all elements should be removed or that bridging is occurring.

An important object of this invention is to provide a detector capable of detecting a predetermined spacing of filter cakes on adjacent filtering elements.

Another object of the invention is to provide such a detector in which the pressure of the prefilt is utilized to cause the detector to function.

Another object of the invention is to provide a unitary, self-contained instrument that may be suspended between adjacent elements of a multi-element filtering apparatus and may be capable of detecting when the spacing between adjacent filter cakes has attained a predetermined value.

Another object of the invention is to provide such a detector which can be utilized between any two adjacent filtering elements alone, or between every pair of adjacent elements either in series or in parallel arrangement.

In one aspect of the invention, a hollow frame member, having a thickness equal to the permissible minimum spacing of filter cake on adjacent filter elements, may include an opening in each side, and one side may be removable for facilitating assembly. Each opening may be closed by an hermetically sealed diaphragm of electrically conducting material, in the center of each of which may be located an electrical contact.

In another aspect of the invention, a flexible, hollow tube may be connected to the hollow frame member and its free end may be sealed off. The chamber formed by the diaphragm-closed frame member in communication with the interior of the flexible, hollow tube may be filled with a high dielectric so that no short circuiting between the diaphragms will occur when they are connected in series into an electrical circuit except through the contacts at the center of each when they are in engagement.

In still another aspect of the invention, separate conductors may lead from the separate diaphragms to separate female jack retainers into which male jacks may be plugged that lead from a magnetic relay or the like and a current supply. The construction and arrangement may be such that the two diaphragms are in series with each other and the magnetic relay, so that normally the contacts at the center of the diaphragms maintain a magnetic relay energized that holds open a circuit for stopping the filtering cycle, sounding an alarm, initiating a cake-removal cycle or just causing an indicator to indicate a condition requiring cake removal.

With the device suspended between adjacent filtering elements, the normal pressure of the prefilt acts upon both diaphragms as well as upon the flexible tube depending from the hollow frame member in which the diaphragms are mounted. This pressure may be in the order of about 65 p.s.i. and the pressure drop through the cake may be in the neighborhood of as much as 45 p.s.i. The area of the diaphragms is such that the prefilt pressure acting on them maintains their central contacts closed and the dielectric in the chamber and tube under such pressure that the tube will not be collapsed by the prefilt pressure acting on it.

However, when both diaphragms are sealed off from the prefilt pressure by filter cakes building up on adjacent elements to a point where the cakes contact the sides of the hollow frame member supporting the diaphragms, the prefilt pressure on the flexible tube collapses it, causing a displacement of the dielectric from the tube into the chamber within the hollow frame member, forcing the diaphragms apart and consequently forcing the contacts at the centers thereof apart. Accordingly, the magnetic relay is de-energized, causing stopping of the filtering cycle, sounding an alarm or initiating a cake-removing cycle.

The above, other objects and novel features of the invention will become apparent from the following specification and accompanying drawings which are merely exemplary.

In the drawings:

FIG. 1 is a partial sectional elevational view of an industrial filter to which the principles of the invention have been applied;

FIGS. 2, 3 and 4 are sectional views of a detail of the spacing indicator in three conditions of cake accumulation on adjacent filtering elements;

FIG. 5 is an enlarged sectional elevational view taken substantially along lines 5—5 of FIG. 1; and FIG. 6 is a sectional elevational view taken substantially along line 6—6 of FIG. 5.

Referring to the drawings, and particularly to FIG. 1, the instrument involving the principles of the invention is shown as employed in a vertical pressure-leaf filter comprising a tank 10 that is closed by a removable dome 11. An inlet pipe 12 is adapted to feed prefilt into the tank 10 under a predetermined pressure. A plurality of leaf-type filters 13 may be mounted in spaced parallel relation, and each may have its outlet 14 connected to a main outlet line 15 that feeds the filtrate from the tank to storage or to a process requiring the filtrate.

The leaf-type filters may comprise rigid, relatively coarse mesh screen 16 surrounded by a hollow frame member 17 having an outlet 14 leading to the main outlet header 15. They may be covered with filter cloth that may be treated with filter-aids in a known manner.

Referring to FIGS. 5 and 6, the filter cake spacing indicator may be in the form of a pendent which is adapted to be disposed between the leaf filters. The indicator may include a frame member 18 having a recess 19 therein and provided with a threaded opening 20 on one side thereof. The side of frame 18 opposite that containing the threaded opening 20 may include an opening 21 having bars 22 and 23 thereacross. A diaphragm 24 may be hermetically sealed to the inner wall of member 18 in a manner to close the opening 21.

A threaded disc 25 may also be provided with an opening 26 similar to the opening 21, and it may also have a diaphragm 27 hermetically sealed to its one face. The construction and arrangement may be such that when disc 25 is threaded into the threaded opening 20 against a gasket 28, a chamber is formed by the recess 19 and the disc 25.

A fitting 29 may connect an outlet 30 from chamber 19 to another chamber, which in the embodiment disclosed is shown as a flexible tube 31 having its free end 32 sealed.

Each of the diaphgrams 24 and 27 preferably is made of electrically conducting material coated with an insulating material, and they are connected, respectively, to separate electrical conductors 33 and 34. The conductors 33 and 34 extend through passages within frame member 18 and a terminal block 35 that is threaded into a threaded recess 36 within member 18. The passages through which conductors 33 and 34 pass are otherwise hermetically sealed, so that the chamber formed by recess 19 and the inside of the tube 31 define an hermetically sealed enclosure for a purpose to be described later.

A tubular supporting element 37 may be fixed to the terminal block 35 by a cap 38 that is threaded to the block 35. The element 37 may have conductors 39 and 40 therein leading from the terminal block 35 to a female end jack retainer 41. A male end jack retainer 42 may be connected to a conduit 43 by a seat element 44, and a coupling member 45 may be employed to retain the male jacks in electrical contact within the female jacks. A cable 46 containing the lines leading from the male jacks extends through the tubular member 43 to the apparatus in series with a power supply for controlling the filtering process by stopping it, by operating an alarm, by initiating a cake-removal cycle or the like, when the circuit therethrough is interrupted.

Referring to FIG. 6, electrical contacts 47 and 48 may be provided on the facing sides of the electrically conducting diaphragms 24 and 27, which contacts normally are maintained in engagement.

Referring to FIG. 5, the frame 18 may include a closure 49 for an inlet 50 leading to the chamber formed by the recess 19 and the disc 25. Prior to use, the chamber as well as the interior of tube 31 are completely filled with a high dielectric liquid for a purpose presently to be described.

With the instrument in the position shown in FIG. 1, and the filtering process in progress, the prefilt enters the tank 10 through the inlet 12 under a predetermined pressure, passing the leaf filters 13 to the outlet 15, thence to a storage tank or to a process requiring the filtrate.

Referring to FIG. 2, it is evident that with no substantial cake on the filter elements 13, the pressure of the prefilt acts on both diaphragms 24 and 27 as well as on the flexible tube 31. The effective area of the diaphragms 24 and 27 relatively to that of tube 31 is such that under the conditions of FIG. 2, the contacts 47 and 48 remain closed, and tube 31 is retained full of the dielectric liqud.

Referring to FIG. 3, as the filter cake 51 builds up on adjacent elements 13 at different rates, and to a point where the opening 26 is closed off while the opening 21 is still open, the pressure of the prefilt forces the diaphragms 24 and 27 rightwardly while still retaining contacts 47 and 48 in engagement. The pressure in opening 26 is less than the prefilt pressure as applied to opening 21 and the flexible tube 31 by an amount equal to the pressure drop across the sealed face of the detector housing 18. Any liquid entrapped within the confines of openings 26 and the filter cake closing it will be forced through the cake to the interior of the leaf filter.

Referring to FIG. 4, when both openings 21 and 26 are closed off, by the building up of the cake 51, the spacing of the cake 51 on adjacent filter elements is such as to require its removal to insure efficient filtering of the prefilt. The diaphragms 24 and 27 are no longer externally subjected to the pressure of the prefilt since the openings 21 and 26 are now blocked off. However, the flexible tube 31 is still subjected to the prefilt pressure, causing it to collapse and displacing the dielectric therein into the diaphragm chamber, forcing the diaphragms 24 and 27 apart, hence opening contacts 47 and 48. Any liquid trapped within the openings 21 and 26 by the cake 51 will be forced through the cake, permitting separation of the contacts 47 and 48. Separation of the contacts 47 and 48 de-energizes the circuit leading to the controller for the filtering process.

Although the various features of the filter cake spacing detector have been shown and described in detail to fully disclose one embodiment of the invention, it will be evident that changes may be made in such details and certain features may be used without others without departing from the principles of the invention.

What is claimed is:

1. A bridging detector for detecting the spacing between adjacent surfaces, the spacing between which varies during the functioning of a process, comprising in combination, interconnected means each having opposed pressure responsive means disposed between said adjacent surfaces and adapted to be externally subjected to pressure in opposite directions incident to said process; electrical contact means responsive to the action of said pressure responsive means; and means rendered effective by the variation of the spacing between said adjacent surfaces for removing the external pressure from the pressure responsive means of one of the interconnected means while retaining said external pressure on the pressure responsive means of the other interconnected means.

2. A bridging detector comprising in combination, liquid filled chamber means; pressure responsive flexible diaphragm means forming opposed walls of part of said chamber means; electrical contact means responsive to the action of said diaphragm means; pressure responsive surface means forming another part of said chamber means; means effective during a spacing detection to seal off said diaphragm means in response to a function involving said spacing detection; and means responsive to said sealing off of said diaphragm means for causing said diaphragm means to operate said contact means.

3. A bridging detector for detecting the spacing between adjacent surfaces, the spacing between which varies during the functioning of a process, comprising in combination, interconnected fluid actuated means, each having opposed pressure responsive means disposed between said adjacent surfaces and adapted to be externally subjected to pressure in opposite directions incident to said process; electrical contact means responsive to the action of one of said pressure responsive means; and means rendered effective by the variation of the spacing between said adjacent surfaces for removing the external pressure from the pressure responsive means of one of the interconnected means while retaining said external pressure on the pressure responsive means of the other of the interconnected means.

4. In a bridging detector, a sealed chamber comprising parallel walls spaced apart an amount equal to the spacing desired to be detected; separate opposed flexible diaphragm means attached to each of said walls; electrical contacts fixed to the inner surfaces of said diaphragm means; a resilient tube means communicating with said chamber having its free end sealed and being adapted to be disposed within the spacing of said parallel walls; separate electrical conductors connected to each of said contacts and extending outwardly from said chamber; and high dielectric liquid substantially filling said chamber and tube.

5. In a bridging detector, a sealed chamber comprising parallel walls spaced apart an amount equal to the spacing desired to be detected, said walls having aligned openings; flexible diaphragm means attached to the inner surfaces of said walls and covering said openings; electrical contacts fixed to the inner surfaces of said diaphragm means; a resilient tube communicating with said chamber having its free end sealed and being adapted to be disposed within the spacing of said parallel walls; separate electrical conductors connected to each of said contacts and extending outwardly from said chamber; and dielectric liquid substantially filling said chamber and tube.

6. In a bridging detector, a pressure responsive sealed chamber means comprising parallel walls spaced apart an amount equal to the spacing desired to be detected; separate opposed flexible diaphragm means attached to each of said walls; electrical contacts fixed to the center of the inner surfaces of said diaphragm means; another pressure responsive sealed chamber means in communication with said pressure responsive chamber means and having an outside transverse dimension less than that of said pressure responsive chamber means; separate electrical conductors connected to each of said contacts and extending outwardly from said pressure responsive chamber means; and dielectric liquid substantially filling said chambers.

7. In a bridging detector, a pressure responsive sealed chamber means comprising parallel walls spaced apart an amount equal to the spacing desired to be detected said walls having aligned openings; flexible diaphragm means attached to the inner surfaces of said walls and covering said openings; electrical contacts fixed to the center of the inner surfaces of said diaphragm means; another pressure responsive sealed chamber means in communication with said pressure responsive chamber means and having an outside transverse dimension less than that of said pressure responsive chamber means; separate electrical conductors connected to each of said contacts and extending outwardly from said pressure responsive chamber means; and dielectric liquid substantially filling said chambers.

8. A bridging detector for use with multiple leaf-type filters comprising in combination, a pendant adapted to be supported between adjacent leaf filters; separate interconnected means supported by said pendant, and each having opposed pressure responsive means adapted to be externally subjected to the pressure of the prefilt between said leaf filters; electrical contact means responsive to the action of one of said pressure responsive means; and means rendered effective by the filter cake accumulating on the adjacent leaf filters for removing the prefilt pressure from the pressure responsive means of one of said interconnected means while retaining the prefilt pressure on the pressure responsive means of the other of said interconnected means.

9. A bridging detector for use with multiple leaf-type filters comprising in combination, a pendant adapted to be supported between adjacent leaf filters; fluid filled intercommunicating chamber means; opposed pressure responsive means forming part of said chamber means and externally subjected to the pressure of the prefilt between said leaf filters; electrical contact means responsive to the action of the pressure responsive means of one of said chamber means; and means rendered effective by the filter cake accumulating on said adjacent leaf filters for removing the prefilt pressure from the pressure responsive means of one of said intercommunicating chamber means while retaining the prefilt pressure on the pressure responsive means of the other of said intercommunicating chamber means.

10. A bridging detector for use with multiple leaf-type filters comprising in combination, a pendant adapted to be supported between adjacent leaf filters; liquid filled chamber means supported by said pendant; flexible diaphragm means forming opposed walls of part of said chamber means; electrical contact means responsive to the action of said diaphragm means; pressure responsive surface means forming another part of said chamber means; means responsive to the filter cake accumulating on said adjacent leaf filters for sealing off said diaphragm means for causing said diaphragm means to operate in a manner to actuate said contact means.

11. A bridging detector for use with multiple leaf-type filters comprising in combination, a pendant adapted to be supported between adjacent leaf filters; liquid filled intercommunicating chambers attached to said pendant and having pressure responsive surface means forming a part thereof; means forming a rigid surface completely surrounding the pressure responsive surface means of one of said chambers and lying within a plane spaced from the pressure responsive surface means of the other of said chambers; and electrical contact means supported by said pendant, said electrical contact means being actuated by the response of the pressure responsive surface means of one of said chambers.

12. A bridging detector for use with multiple leaf-type filters comprising in combination, a pendant adapted to be supported between adjacent leaf filters; an hermetically sealed chamber attached to said pendant and comprising parallel walls; separate opposed flexible diaphragm means attached to each of said walls; electrical contacts fixed to the center of the inner surfaces of said diaphragm means; a resilient tube communicating with said chamber having its free end sealed and having an outside diameter less than the spacing of said parallel walls; separate electrical conductors connected to each of said contacts and extending outwardly from said chamber and through said pendant; and dielectric liquid substantially filling said chamber and tube.

13. A bridging detector for use with multiple leaf-type filters comprising in combination, a pendant adapted to be supported between adjacent leaf filters; an hermetically sealed chamber attached to said pendant and comprising parallel walls, said walls having aligned openings; flexible diaphragm means attached to the inner surfaces of said walls and covering said openings; electrical contacts fixed to the center of the inner surfaces of said diaphragm means; a resilient tube communicating with said chamber having its free end sealed and having an outside diameter less than the spacing of said parallel walls; separate electrical conductors connected to each of said contacts and extending outwardly from said chamber and through said pendant; and dielectric liquid substantially filling said chamber and tube.

14. A bridging detector for use with multiple leaf-type filters comprising in combination, a pendant adapted to be supported between adjacent leaf filters; a pressure sensitive hermetically sealed chamber means attached to said pendant and comprising parallel spaced walls; separate opposed flexible diaphragm means attached to each of said walls; electrical contacts fixed to the center of the inner surfaces of said diaphragm means; another pressure responsive hermetically sealed chamber means in communication with said pressure sensitive hermetically sealed chamber means and having an outside transverse dimension less than that of said pressure sensitive hermetically sealed chamber means; separate electrical conductors connected to each of said contacts and extending outwardly from said pressure sensitive hermetically sealed chamber means and through said pendant; and dielectric liquid substantially filling said chamber means.

References Cited in the file of this patent
UNITED STATES PATENTS

| 1,227,983 | Vallez | May 29, 1917 |
| 2,912,110 | Stoltenberg | Nov. 10, 1959 |